United States Patent [19]

Chassagneux et al.

[11] Patent Number: 4,844,943

[45] Date of Patent: Jul. 4, 1989

[54] PROCESS FOR PROTECTING METALLIC SURFACES AGAINST VANADOSODIC CORROSION

[75] Inventors: Evelyne M. Chassagneux, Millery; Gérard A. Thomas, Saint-Etienne, both of France

[73] Assignee: Elf France, Courbevoie, France

[21] Appl. No.: 95,424

[22] Filed: Sep. 10, 1987

[30] Foreign Application Priority Data

Sep. 12, 1986 [FR] France .................................. 8612747

[51] Int. Cl.$^4$ ........................ B05D 1/00; C23C 16/00; C03C 27/02; B32B 15/00
[52] U.S. Cl. ...................................... 427/34; 427/250; 427/255.3; 428/632; 428/633; 428/678
[58] Field of Search ....................... 427/34, 255.3, 250; 428/632, 633, 678; 148/6.3

[56] References Cited

U.S. PATENT DOCUMENTS

| | | | |
|---|---|---|---|
| 3,663,279 | 5/1972 | Lepselter | 428/633 |
| 3,961,098 | 6/1976 | Bessen | 427/34 |
| 4,255,495 | 3/1981 | Levine et al. | 428/678 |
| 4,279,666 | 7/1981 | Micheli | 148/6.3 |
| 4,313,760 | 2/1982 | Dardi et al. | 428/678 |
| 4,328,285 | 5/1982 | Siemers et al. | 427/34 |
| 4,351,854 | 9/1982 | Pelerin | 427/34 |
| 4,478,648 | 10/1984 | Zeilinger et al. | 148/6.3 |
| 4,613,386 | 9/1986 | Yates et al. | 428/632 |
| 4,658,761 | 4/1987 | Duggan | 427/226 |
| 4,767,678 | 8/1988 | Yates et al. | 428/632 |

FOREIGN PATENT DOCUMENTS 2421927 12/1974 Fed. Rep. of Germany ...... 416/241

OTHER PUBLICATIONS

Webster's 3rd International Dictionary, p. 1767.
Hackh's Chemical Dictionary, McGraw-Hill Book Co., 3rd ed. 1944 p. 674.

*Primary Examiner*—Norman Morgenstern
*Assistant Examiner*—Marianne L. Padgett
*Attorney, Agent, or Firm*—Burgess, Ryan and Wayne

[57] ABSTRACT

A process is provided for protecting metallic surfaces such as stainless steel, against vanadosodic corrosion which utilizes at least one metal such as the alkaline earth metals which oxidizes in situ into a protective layer. The layer forms a compound with vanadium and/or sodium oxide which has a softening point higher than that of the oxide.

8 Claims, No Drawings

PROCESS FOR PROTECTING METALLIC SURFACES AGAINST VANADOSODIC CORROSION

FIELD OF THE INVENTION

Background of the invention

The present invention concerns the protection of metal surfaces against vanadosodic corrosion.

Heavy fuels, issued from relatively inexpensive residues of petroleum distillation, constitute an economic power source.

These heavy fuels contain considerable quantities of alkaline and alkaline-earth metals. They also contain heavy metals, especially vanadium and sulfur. In most of these fuels, the proportion of vanadium can reach from 50 to 200 ppm and supply up to 50% of the total ashes. This vanadium is present in the form of metaloporphyrine.

The combustion of heavy fuels produces the formation of oxides, such as vanadium pentoxide or sodium oxide.

The deposit of these compounds in the form of ashes on the metallic walls raises serious corrosion problems. This "vanadosodic" corrosion, caused by vanadium and sodium oxides is considered by J. BENARD in "L'oxydation des métaux" (GAUTHIER-VILLARS 1964 II 297) as "catastrophic oxidation".

The ashes of heavy fuels having a high vanadium content, have a melt point lower than the temperature of the gases during combustion. They have the consistency of a paste and adhere easily to hot surfaces. The oxide gangue that is formed on the metallic surfaces slows down heat exchange and especially provokes the migration of metals, such as iron or nickel from steels. This dissolution of the metals leads to cracks and a decrease in the thickness of the metallic surfaces, which can even lead to their complete destruction.

Replacing the corroded metal, and the frequent shutdown of the installations that this causes, constitute high operating costs for the companies involved.

Vanadosodic corrosion is particularly extensive in refinery turbines and furnaces.

In industrial gas turbines, the fuel is injected in the form of droplets, into the combustion chamber. The ashes carried along by the heavy fuel combustion product are deposited on the walls and provoke extensive corrosion, even the complete destruction of the material, after a relatively short exposure period. Thus, extensive corrosion has been observed after an exposure period of 100 hours in a combustion atmosphere containing vanadium in the form of pentoxide and sodium in the form of chloride and sulfate (A. DAVIN et al. Metal-Slag-gas reactions and processes 1975, 678-692).

A similar type of problem arises in refinery furnaces. These furnaces comprise a certain number of parallel tube bundles. These tubes are placed along the length of the walls of the combustion chamber. The ashes are mainly deposited on the supports due to their geometry and their very high temperature and can provoke spectacular corrosion. (D. M. WARD et al. Behaviour of high temperature alloys in aggressive environments, Proc. int. conf. Petten (1979) 829-860).

To decrease vanadosodic corrosion, the usual practice is to add additives to the boiler feeds.

Magnesia is added in the form of a fine powder in the combustion air (O. F. Daebeler, ASME Paper No. 63-WA-352, November 1963). Magnesium oxides mixed with aluminum oxides can also be used (G. K. Lee, Fuel Soc. J. Univ. of Sheffield 20, 8-17 (1969).

Organosoluble magnesium salts, such as sulfonates or carbonate overbased sulfonates are added to the fuel.

Certain of these additives must be used in greatly excessive quantities and do not ensure sufficiently efficient protection.

It has also been suggested to protect metallic surfaces by means of a cerium oxide coating, possibly mixed with zirconium oxide (U.S. Pat. No. 4,328,285). The application of metals in the oxide form does not allow to obtain a compact and homogeneous protective layer.

The process according to the invention overcomes these drawbacks and ensures an efficient preventive protection. It is particularly recommended for the protection of turbines, refinery furnaces and boilers equipped with a steam super-heater.

This process for protecting metallic surfaces against corrosion by vanadium and/or sodium oxides produced from the combustion of heavy fuels uses a protective layer comprising at least one metallic oxide, in which is deposited on the metallic surface at least one metal that oxidizes in situ into the protective oxide layer, this layer forming with the vanadium and/or sodium oxides a compound of which the softening point is higher than that of the oxides.

Metals are suitable for this process, provided that their oxides form with the vanadium and/or sodium oxides a compound of which the softening point is higher than that of the vanadium and/or sodium oxide. Among these metals can be cited those belonging to group 2a of the Periodic Classification of Elements called alkaline-earth metals: i.e. beryllaum, magnesium, calcium, strontium and barium, those belonging to group 3a of the Periodic Classification of Elements: i.e. boron, aluminum, gallium, indium and thallium or silicon, zirconium, cerium or titanium.

The metallic deposit is formed from one or several of these metals. The alkaline-earth metals and more particularly magnesium are preferably used.

The metallic surfaces to be protected can be of very different kinds. Generally, they comprise iron, nickel, chromium, cobalt, molybdenum or mixtures thereof. Thus, the different stainless steels can be protected by the process according to the invention.

The metallic deposit can be formed by any known process, for example by evaporation under vacuum of the metal, by projection by plasma or by chemical reaction.

In the case of coating by evaporation under vacuum, the metal to be used as a coating is placed in the form of a powder or pellet in a receptacle that is introduced, at the same time as the metallic object to be protected, into an enclosure under vacuum. The metallic powder or pellet is heated until evaporation, the metal in the form of gas is deposited in a homogeneous film on the metallic object. The operation is interrupted once the desired thickness has been achieved.

For hot projection by plasma flame, the metal is introduced in the form of powder into the plasma flux formed by an electric arc under argon atmosphere.

The thickness of the metal layer is generally comprised between 0.1 and 1 $\mu$m and preferably between 0.2 and 0.6 $\mu$m.

The metallic layer formed can be oxidized through heating in the presence of oxygen.

According to another embodiment of the process, the protective layer is formed at the moment of the combustion of the heavy fuels. The metallic deposit reacts with the oxygen and the vanadium and/or sodium oxides in one or two steps. A magnesium deposit, for example, forms with vanadium and oxygen the compound $Mg_3V_2O_8$.

To evaluate the efficiency of the coating, metallic probes that are either protected or not protected by a metallic coating according to the invention are placed in contact with the gases produced from the combustion of the fuels having a high vanadium content.

The stainless steel probes coated with a protective layer according to the invention are not corroded even after an exposure period of several weeks during while the nonprotected probes are attacked by the corrosion.

The protective effect of the metallic layer can be evaluated in the laboratory by comparison of the weight changes due to the corrosion of the different samples. To do this, a metallic object is coated with a protective layer, then a layer of vanadium pentoxide, then both are heated under oxygen atmosphere. The weight change of the two samples is measured in function of time. The weight change of the non protected sample is about three times greater than that of the sample protected according to the invention.

The following examples illustrate the invention without in any way limiting the same.

EXAMPLE 1

The deposit of a magnesium layer on a nickel support through evaporation under vacuum will now be described.

A JEE® type evaporator under vacuum such as commercially produced by JAPAN ELECTRON OPTICS LABORATORY of TOKYO is used. This device comprises a vacuum bell jar provided with a double pumping system, consisting of a primary pump with blades and a diffusion pump for the secondary vacuum.

The residual pressure is measured by means of an ionisation gauge and the thickness of the layer of coating formed measured by a VEECO QM 311 quartz oscillator.

Underneath the vacuum bell jar the magnesium is introduced in the form of powder in a platinum crucible. The nickel probe is maintained 4 cm beneath the crucible. The pumping begins and continues until the residual pressure is lower than or equal to $5.10^{-1}$ Pa. The magnesium powder is heated by a molybdenum heating coil.

The magnesium sublimates above 527° C. When the quartz oscillator indicates that the thickness of the layer has been reached, the deposit is interrupted by covering the crucible with a lid handled from the outside. For the tests that were performed, a magnesium layer of 0.4 μm thickness was deposited.

EXAMPLE 2

Under operating conditions identical to those prevailing in Example 1, a magnesium layer of 0.4 μm is deposited on a support made of stainless steel AISI 310 Fe/C25/N:20 (Mn 2%, Si 1%).

EXAMPLE 3

A nickel sample coated with magnesium according to example 1, is introduced into the evaporator under vacuum. In the crucible is disposed vanadium pentoxide in the form of pellets obtained by compression of powder.

At a residual pressure of about $5.10^{-2}$ Pa, the vanadium pentoxide is heated to a temperature higher than 670° C. The deposit of $V_2O_5$ is continued until the obtention of a $Mg/V_2O_5$ molar proportion of 3/1 which corresponds to a Mg/V mass ratio of 0.8/1.

EXAMPLE 4

Under operating conditions identical to those of example 3, a deposit of vanadium pentoxide is formed on a nickel support.

EXAMPLE 5

Under operating conditions identical to those of example 3 a vanadium pentoxide deposit is formed on a steel support AISI 310 covered with magnesium according to example 2. The deposit is continued until the obtention of a $Mg/V_2O_5$ molar ratio of 3:1 which corresponds to a Mg/V mass ratio of 0.8/1.

EXAMPLE 6

Under operating conditions identical to those of example 3, a deposit of vanadium pentoxide is formed on a AISI 310 stainless steel support.

EXAMPLE 7

The sample issuing from examples 3 to 6 are placed in a pure oxygen atmosphere of which the pressure is adjusted to 20 kPa. The temperature is maintained at 900° C. The variations of mass in function of time are summarized in Table 1.

TABLE 1

| | Variation in mass in mg · cm$^{-2}$ | | | |
| | Time in hrs | | | |
| | 5 | 10 | 15 | 20 |
|---|---|---|---|---|
| Example 3 | 0.78 | 1.02 | 1.25 | 1.4 |
| Example 4 | 1.5 | 1.98 | 2.32 | 2.62 |
| Example 5 | 0 | 0 | 0.05 | 0.12 |
| Example 6 | 1.85 | 2.45 | 2.78 | 2.80 |

The corrosion observed is much less widespread for the nickel protected by a deposit of Mg (example 3) and especially for protected steel (example 5) than for the nickel in the presence of $V_2O_5$ (example 4) or the steel in the presence of $V_2O_5$ (example 6).

In the case of the non protected steel the corrosion observed is catastrophic.

EXAMPLE 8

In the part of a boiler in contact with hot gases, is introduced a first probe made of stainless steel AISI 310 and a second probe identical to the first, but covered by evaporation under vacuum with a layer of 0.4 μm of magnesium. In order to maintain the temperature of the probes at the same temperature as the wall of the tubes of the boiler, they are cooled by means of air circulating inside.

The characteristics of the fuel used as combustible are summarized in table 2.

TABLE 2

| Characteristics of the fuel | |
|---|---|
| density (15° C.) | 1.02 kg/l |
| kinematic viscosity (100° C.) | 37.1 cSt |
| asphaltenes $C_7$ | 8.8% weight |
| Conradson carbon | 18.3% weight |
| flash point | 109° C. |
| sediments | 0.08% weight |
| carbon | 86.7% weight |

TABLE 2-continued

| Characteristics of the fuel | | |
| --- | --- | --- |
| hydrogen | 9.5% | weight |
| C/H ratio | 9.12 | |
| sulfur | 3.51% | weight |
| total nitrogen | 3112 | ppm |
| metal: | | |
| Ni | 27 | ppm |
| V | 154 | ppm |
| Na | 43 | ppm |
| PCI | 9364 | cal/g |

After one month's use of the boiler, the probes are withdrawn. On the probe treated according to the invention is observed a slighter deposit which is more flaky. After elimination of the deposits, the surface of the treated probe is intact whereas the non treated probe presents traces of corrosion.

What is claimed is:

1. A process for protecting a metallic surface against corrosion by contact with vanadium and/or sodium oxides, at gas combustion temperatures, produced by combustion of heavy fuels, which comprises: depositing on the metallic surface a layer of at least one protective metal selected from the group consisting of alkaline earth metals, boron, aluminum, gallium, indium, thallium, silicon, zirconium and titanium, the protective metal oxidizing in situ to form a protective oxide layer, the protective oxide layer reacting with the vanadium oxide, sodium oxides or mixtures thereof to form a composition having a softening point temperature which is higher than that of the vanadium or sodium oxides.

2. A process according to claim 1, wherein the at least one protective metal comprises the alkaline-earth metals.

3. A process according to claim 2, wherein magnesium comprises the protective metal.

4. Process according to claim 1, wherein the metallic surface to be protected contains at least one metal selected from the group consisting of iron, nickel, chromium, cobalt or molybdenum.

5. Process according to claim 4, wherein the metallic surface to be protected is made of stainless steel.

6. A process according to claim 1, wherein the layer of at least one protective metal is deposited on the metallic surface to be protected by evaporation under vacuum, by projection by plasma or by a chemical reaction.

7. A process according to claim 1, wherein the thickness of the layer of at least one protective metal is comprised between 0.1 and 1 $\mu$m.

8. A process according to claim 7, wherein the thickness of the layer of at least one protective metal is comprised between 0.2 and 0.6 $\mu$m.

* * * * *